United States Patent
Rudnick et al.

(10) Patent No.: US 8,718,807 B2
(45) Date of Patent: May 6, 2014

(54) SYSTEM AND METHOD FOR ROBUST REAL-TIME CONTROL OF REGULAR AUTOMATED PRODUCTION USING MASTER RECIPE

(75) Inventors: Juergen Rudnick, Gruendau (DE); Muslim Gulam Kanji, Orefield, PA (US); Christopher Buonacuore, Collegeville, PA (US); Cathleen F. Kilpatrick, Bethlehem, PA (US); Keith Anushko, Plymouth Meeting, PA (US)

(73) Assignee: Honeywell International Inc., Suwon-si (KR)

( * ) Notice: Subject to any disclaimer, the term of this patent is extended or adjusted under 35 U.S.C. 154(b) by 46 days.

(21) Appl. No.: 13/428,943

(22) Filed: Mar. 23, 2012

(65) Prior Publication Data

US 2013/0253684 A1    Sep. 26, 2013

(51) Int. Cl.
G05B 19/00    (2006.01)

(52) U.S. Cl.
USPC ............................................ 700/96; 700/106

(58) Field of Classification Search
None
See application file for complete search history.

(56) References Cited

U.S. PATENT DOCUMENTS

| | | |
|---|---|---|
| 4,807,224 A | 2/1989 | Naron et al. |
| 5,142,663 A | 8/1992 | Janis et al. |
| 5,191,642 A | 3/1993 | Quick et al. |
| 5,202,990 A | 4/1993 | Saikawa |
| 5,392,432 A | 2/1995 | Engelstad et al. |
| 5,394,324 A | 2/1995 | Clearwater |
| 5,424,958 A | 6/1995 | Knupp |
| 5,499,188 A | 3/1996 | Kline et al. |
| 5,555,504 A | 9/1996 | Lepper et al. |
| 5,729,749 A | 3/1998 | Ito |
| 5,838,968 A | 11/1998 | Culbert |
| 5,867,667 A | 2/1999 | Butman et al. |
| 5,960,441 A | 9/1999 | Bland et al. |
| 5,974,439 A | 10/1999 | Bollella |
| 6,049,798 A | 4/2000 | Bishop et al. |
| 6,157,840 A | 12/2000 | Hogberg et al. |
| 6,279,101 B1 | 8/2001 | Witt et al. |

(Continued)

FOREIGN PATENT DOCUMENTS

| | | |
|---|---|---|
| DE | 4206076 A1 | 9/1993 |
| EP | 1993015 A2 | 11/2008 |
| EP | 2169493 A1 | 3/2010 |
| GB | 2285148 A | 6/1995 |

OTHER PUBLICATIONS

Unknown author, "Guaranteed Messaging with JMS", Jan. 31, 2002, www2.sys-con.com/itsg/virtualcd/java/archives/0604/chappell/index.html.

(Continued)

Primary Examiner — Ryan Jarrett (57) ABSTRACT

A method includes initializing, at a first controller, at least one process step of a control recipe from a master recipe associated with a batch process in response to detection of an event associated with the batch process. The method also includes executing, at the first controller, the at least one process step of the control recipe. The method further includes initializing, at the first controller, at least one second process step of the control recipe while executing the at least one process step of the control recipe. Initializing the at least one process step of the control recipe from the master recipe may include copying only a portion of the master recipe into the control recipe that is needed to begin execution of the control recipe.

20 Claims, 4 Drawing Sheets

(56) References Cited

U.S. PATENT DOCUMENTS

| | | |
|---|---|---|
| 6,282,561 B1 | 8/2001 | Jones et al. |
| 6,317,638 B1 | 11/2001 | Schreder et al. |
| 6,560,720 B1 | 5/2003 | Chirashnya et al. |
| 6,578,005 B1 | 6/2003 | Lesaint et al. |
| 6,591,253 B1 | 7/2003 | Dinkin et al. |
| 6,601,219 B2 | 7/2003 | Miura et al. |
| 6,691,280 B1 | 2/2004 | Dove et al. |
| 6,732,006 B2 | 5/2004 | Haanstra et al. |
| 6,829,647 B1 | 12/2004 | Biran et al. |
| 6,871,293 B2 | 3/2005 | Bomfim et al. |
| 7,020,876 B1 | 3/2006 | Deitz et al. |
| 7,027,493 B2 | 4/2006 | Richards |
| 7,027,954 B2 | 4/2006 | Mets et al. |
| 7,228,527 B1 | 6/2007 | Phillips et al. |
| 7,369,913 B2 | 5/2008 | Heminway et al. |
| 7,506,090 B2 | 3/2009 | Rudnick et al. |
| 7,630,777 B2 | 12/2009 | Rudnick et al. |
| 7,706,895 B2 | 4/2010 | Callaghan |
| 7,756,657 B2 | 7/2010 | Davidson et al. |
| 7,873,428 B2 | 1/2011 | Ellis et al. |
| 8,046,086 B2 | 10/2011 | Pettus et al. |
| 2002/0099464 A1 | 7/2002 | O'Connor et al. |
| 2003/0135537 A1 | 7/2003 | Mikael et al. |
| 2003/0156597 A1 | 8/2003 | Eberle et al. |
| 2005/0039162 A1 | 2/2005 | Cifra |
| 2005/0049722 A1 | 3/2005 | Kobayashi |
| 2005/0055348 A1* | 3/2005 | Deimel et al. ................... 707/6 |
| 2006/0101179 A1 | 5/2006 | Lee et al. |
| 2007/0156272 A1 | 7/2007 | Winstead et al. |
| 2007/0192498 A1 | 8/2007 | Dini et al. |
| 2007/0300120 A1 | 12/2007 | Kim et al. |
| 2008/0288089 A1* | 11/2008 | Pettus et al. ................... 700/9 |
| 2009/0082894 A1 | 3/2009 | Pettus et al. |
| 2009/0125126 A1 | 5/2009 | Moore, Jr. et al. |

OTHER PUBLICATIONS

Unknown Author "Synchronous and Asynchronous I/O", May 30, 2008, msdn.microsoft.com/en-us/library/windows/desktop/aa365683.

Unknown Author, "WebSphere MQ Synchronous Communication", Dec. 20, 2006, publib.boulder.ibm.com/infocenter/zos/basics/index.jsp?topic=/com.ibm.zos.zmidwebs/zmiddle_116.htm.

"TotalPlant Batch Specification and Technical Data" Release 3.0, Honeywell, Apr. 29, 2002, 59 pages.

"Semaphone (programming)", 3 pages, http://en.wikipedia.org/wiki/Semaphore.sub.—(programming).

Lee et al., A Collaborative Scheduling System for Make-to-Order Manufacturing, CIRP Annals, Technische Rundschau, Berne, CH, vol. 45, No. 1, 1996, pp. 461-464.

Coherent Technologies, Inc., "Batch Automation and Optimization Experience," retrieved from the web on Jan. 17, 2008, 2 pages.

ARC Advisory Group, "Rockwell Automation Process Industry Strategies," Oct. 2006, 38 pages.

Rockwell Automation, "RSBizWare, BatchCampaign," User's Guide, Aug. 2007, 71 pages.

Rockwell Automation, "RSBizWare, Batch Process Management for Batch Manufacturing," PhaseManager User's Guide, Jul. 2005, 143 pages.

International Society for Measurement and Control, "Batch Control, Part 1: Models and Terminology," Draft 12, 1994, 133 pages.

Honeywell, "TotalPlant Batch User Guide," Release 8.0, Jul. 2007, 644 pages, see esp. pp. 141-170, 177-204, 211-220, 253-266, 313-368 and 429-442.

Honeywell, "TotalPlant Batch User Guide," Release 2.1, May 2000, 449 pages, see esp. pp. 112-132, 137-153, 157-162, 180-184, 196-235 and 280-290.

Honeywell, "TotalPlant Batch Technical Reference," Release 2.1, May 2000, 435, pages, see esp. pp. 160-187, 192-195, 214-217& 335-354.

Namur, NE33: Anforderungen an Systeme zur Rezeptfahrweise, Jan. 2003, pp. 19-30, XP002460673.

Muller-Heinzeriing et al., Rezeptgesteuerte Fahrweise Von Chargenprozessen Mit Batch X, Munchen, DE, vol. 36, No. 3, Mar. 1994, pp. 43-51, XP000435857.

Pfeffer et al., Automatisierung Von Chargenprozessen Mit Wechselnden Rezepturen in Contronic P, Munchen, DE, vol. 31, No. 8, Aug. 1989, pp. 360-367, XP000053104.

Dokter F, Steuerung Von Chargenprozessen Mit Wechselnden Rezepturen, Munchen, DE, vol. 33, No. 1, Jan. 1991, pp. 26-30, XP000179706.

Kersting et al., Rezeptfahrweise Chemischer Chargenprozesse: Anwendung Der Namur-Empfehlung NE 33, Munchen, DE, vol. 37, No. 2, Feb. 1995, pp. 28-32, XP000492329.

Janicke et al., Rechnergestutzte Systeme Zur Rezeptfahrweise, Munchen, DE, vol. 36, No. 10, Oct. 1994, pp. 38-42, XP000484096.

International Search Report dated Dec. 12, 2007 in connection with PCT Application No. PCT/US2007/015376.

Written Opinion of the International Searching Authority dated Dec. 12, 2007 in connection with PCT Application No. PCT/US2007/015376.

Method for Processing Production Progress Data with Error Correction, IBM Technical Disclosure Bulletin, IBM Corp., New York, US, vol. 38, No. 12, Dec. 1995, pp. 561-563.

International Search Report and Written Opinion of the International Searching Authority dated Jul. 4, 2013 in connection with International Application No. PCT/US2013/030117, 13 pages.

* cited by examiner

SYSTEM AND METHOD FOR ROBUST REAL-TIME CONTROL OF REGULAR AUTOMATED PRODUCTION USING MASTER RECIPE

TECHNICAL FIELD

This disclosure relates generally to control systems and more specifically to a system and method for robust real-time control of regular automated production.

BACKGROUND

Processing facilities are often managed using process control systems. Example processing facilities include chemical, pharmaceutical, paper, and petrochemical production plants. Among other operations, process control systems typically interact with and control industrial equipment in the processing facilities, such as equipment used to produce chemical, pharmaceutical, paper, or petrochemical products.

To facilitate efficient use of industrial equipment in a processing facility, a process control system is often used to automate execution of various production processes. Processing facilities often implement one or multiple fast-paced and high-value production processes. This often demands a procedure automation solution that is highly flexible and that can ensure timely execution of the production processes. However, aggressive real-time requirements in complex automation environments typically cannot be met with conventional automation solutions, which often rely on supervisory personal computer technology to control the production processes.

SUMMARY

This disclosure provides a system and method for robust real-time control of regular automated production.

In a first embodiment, a method includes initializing, at a first controller, at least one process step of a control recipe from a master recipe associated with a batch process in response to detection of an event associated with the batch process. The method also includes executing, at the first controller, the at least one process step of the control recipe. The method further includes initializing, at the first controller, at least one second process step of the control recipe while executing the at least one process step of the control recipe.

In a second embodiment, a system includes a first controller having at least one memory and at least one processing unit. The at least one processing unit is configured to initialize at least one process step of a control recipe from a master recipe associated with a batch process in response to detection of an event associated with the batch process. The at least one processing unit is also configured to execute the at least one process step of the control recipe and initialize at least one second process step of the control recipe while executing the at least one process step of the control recipe.

In a third embodiment, a non-transitory computer readable medium embodies a computer program. The computer program includes computer readable program code for initializing, at a first controller, at least one process step of a control recipe from a master recipe associated with a batch process in response to detection of an event associated with the batch process. The computer program also includes computer readable program code for executing, at the first controller, the at least one process step of the control recipe. The computer program further includes computer readable program code for initializing, at the first controller, at least one second process step of the control recipe while executing the at least one process step of the control recipe.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Many modern batch production processes use robust, low-latency, real-time control equipment for control of production and related processes and activities. Such processes may include large, regular arrangements of production equipment to increase production capacity and agility, reduce the scope of loss, and achieve economic scalability. The economic costs of configuration services for first time use and on-going maintenance of the automated control system for such regular production equipment often exceeds the value of the automation equipment itself. In addition, these costs may increase dramatically with the number of units per class if the system does not natively support such production.

The cost issues of configuration and maintenance are even more apparent if any human activity for engineering services or maintenance requires very low error rates, such as in the case of pharmaceutical production (drug safety), hazardous chemical production (general safety), or terminal automation (such as high-value gas or oil). In these and other cases, the corrective measures to reduce human error rates may be very cost-intensive.

Solutions to address these cost issues using industry-standard personal computers (PCs), servers, or mainframes that have the required computing resources (such as CPU, memory, and bandwidth) are available. However, these solutions may not satisfy batch production requirements with respect to robustness, availability, and low latency. Solutions for robust batch control using embedded process controllers are also available. However, such solutions may fail to satisfy requirements to economically scale the associated batch production processes up or down. For example, some solutions allocate all or large portions of the required computing resources (such as to create a computing process, allocate memory, and so forth) at the beginning of the production process, step, or activity. This allocation may cause a burst load on a host computer. If multiple such processes are started in a short time window, these burst loads may cause resource exhaustion, large latencies, or even system failures of the host if the host is economically scaled to average processing requirements. For simplicity of design, some solutions also make full copies of a master recipe, which adds to the overall resource consumption problem.

To solve these issues, this disclosure provides a system and method that take advantage of the fact that data structures used to describe batch production requirements and to capture their results (such as procedures, recipes, formula sets, equipment requirements, and the like) may share similar formats and may not be needed at the same time. Furthermore, data structures associated with batch production may contain information that anticipates possible or likely orders of production flow, even if the actual production flow is dependent on external factors that are either not known to the automation systems or not controllable.

The various embodiments described below are described with respect to a batch production system. However, this disclosure is not limited to batch production environments. The principles disclosed here are applicable to other environments and industries, such as transportation and movement of goods like loading and unloading of cargo on shipping vessels.

Figure 1:
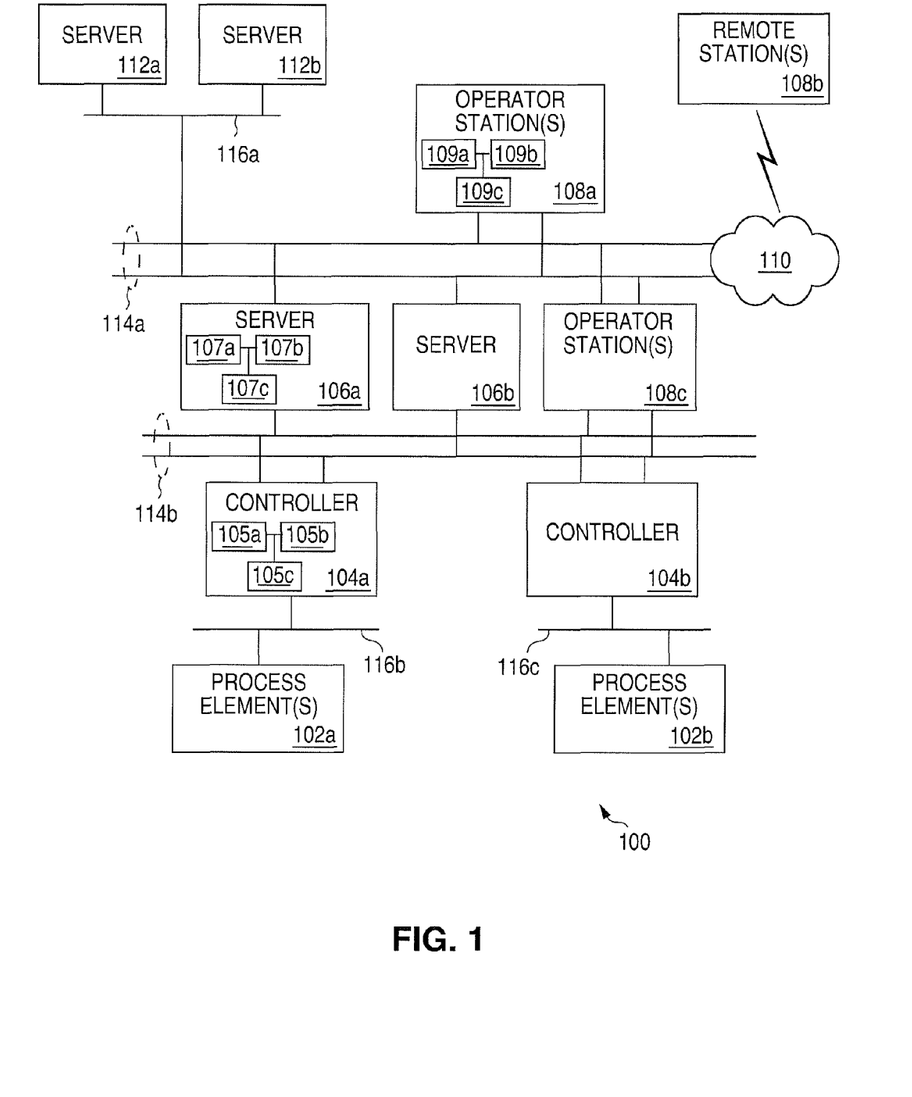
FIG. 1 illustrates an example process control system in accordance with this disclosure.

FIG. 1 illustrates an example process control system 100 in accordance with this disclosure. As shown in FIG. 1, the process control system 100 includes one or more process elements 102a-102b. The process elements 102a-102b represent components in a process or production system that may perform any of a wide variety of functions. For example, the process elements 102a-102b could represent equipment used to manufacture chemical, pharmaceutical, paper, or petrochemical products. Each process element 102a-102b includes any suitable structure for performing one or more functions in a process system. Also, a process system represents any system or portion thereof configured to process one or more materials in some manner.

Two controllers 104a-104b are coupled to the process elements 102a-102b. The controllers 104a-104b control the operation of the process elements 102a-102b. For example, the controllers 104a-104b could be capable of providing control signals to the process elements 102a-102b for controlling the production of chemical, pharmaceutical, paper, or petrochemical products. Each controller 104a-104b includes any suitable structure for controlling one or more process elements 102a-102b. Each controller 104a-104b could, for example, include one or more processors 105a and one or more memories 105b for storing instructions and data used, collected, or generated by the processor(s) 105a. Each controller 104a-104b could also include one or more network interfaces 105c for communicating over one or more networks, such as an Ethernet network, an electrical signal network, a pneumatic control signal network, or any other or additional type(s) of network(s).

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each server 106a-106b includes any suitable structure for providing access to or control of the controllers 104a-104b. Each server 106a-106b could, for example, include one or more processors 107a and one or more memories 107b storing instructions and data used, collected, or generated by the processor(s) 107a. Each server 106a-106b could also include one or more network interfaces 107c for communicating over one or more networks.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing direct user access to the controllers 104a-104b. As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each operator station 108a-108c includes any suitable structure for supporting user access and control of the system 100. Each operator station 108a-108c could, for example, include one or more processors 109a and one or more memories 109b storing instructions and data used, collected, or generated by the processor(s) 109a. Each operator station 108a-108c could also include one or more network interfaces 109c for communicating over one or more networks. In particular embodiments, the operator stations 108a-108c could represent personal computers executing a MICROSOFT WINDOWS or other operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each server 112a-112b includes any suitable structure for controlling the overall operation of the system 100.

As shown in FIG. 1, the system 100 includes various redundant networks 114a-114b and single networks 116a-116c that support communication between components in the system 100. Each of these networks 114a-114b, 116a-116c represents any network or combination of networks facilitating communication between components in the system 100. The networks 114a-114b, 116a-116c could, for example, represent Ethernet networks.

In one aspect of operation, the process control system 100 manages one or multiple processes for producing one or more products (or parts thereof). As particular examples, the controllers 104a-104b and the servers 106a-106b could manage one or multiple processes used to produce chemical, pharmaceutical, paper, or petrochemical products using the process elements 102a-102b. The process control system 100 may implement a procedural automation mechanism that helps to automate the production processes. For example, the procedural automation mechanism may determine when certain tasks in a production process can be performed and which process elements 102a-102b are used during those tasks.

In some embodiments, the procedural automation mechanism supports the use of one or multiple "recipes." A recipe generally represents information defining the production requirements for one or more specific products (or parts thereof). More specifically, multiple recipes may include a master recipe and one or more control recipes. In some embodiments, a master recipe is an object that is loaded, and a control recipe is an object that is executed. For example, a control recipe can contain run-time data and retrieve load-time data from a master recipe, as is described in greater detail below. In some embodiments, a control recipe is implemented using one or more function blocks, which represent executable software objects that can be combined together to define a control process implemented by one or more controllers 104a-104b. As a particular example, a control recipe could be implemented using multiple "phase" function blocks, which represent phases or portions of a control recipe (such as individual process steps of the control recipe). In particular embodiments, the controllers 104a-104b may be configured to perform one or more techniques to support robust, real-time control of automated production as described in more detail below.

Although FIG. 1 illustrates one example of a process control system 100, various changes may be made to FIG. 1. For example, a process control system could include any number of process elements, controllers, servers, operator stations, and networks. Also, the makeup and arrangement of the process control system 100 is for illustration only. Components could be added, omitted, combined, or placed in any other configuration according to particular needs. Further, while described as being used to produce certain types of products, the process control system 100 could be used in any other manner. In addition, FIG. 1 illustrates one operational environment in which the procedural automation mechanism described below can be used. The procedural automation mechanism could be used in any other device or system.

Figure 2:
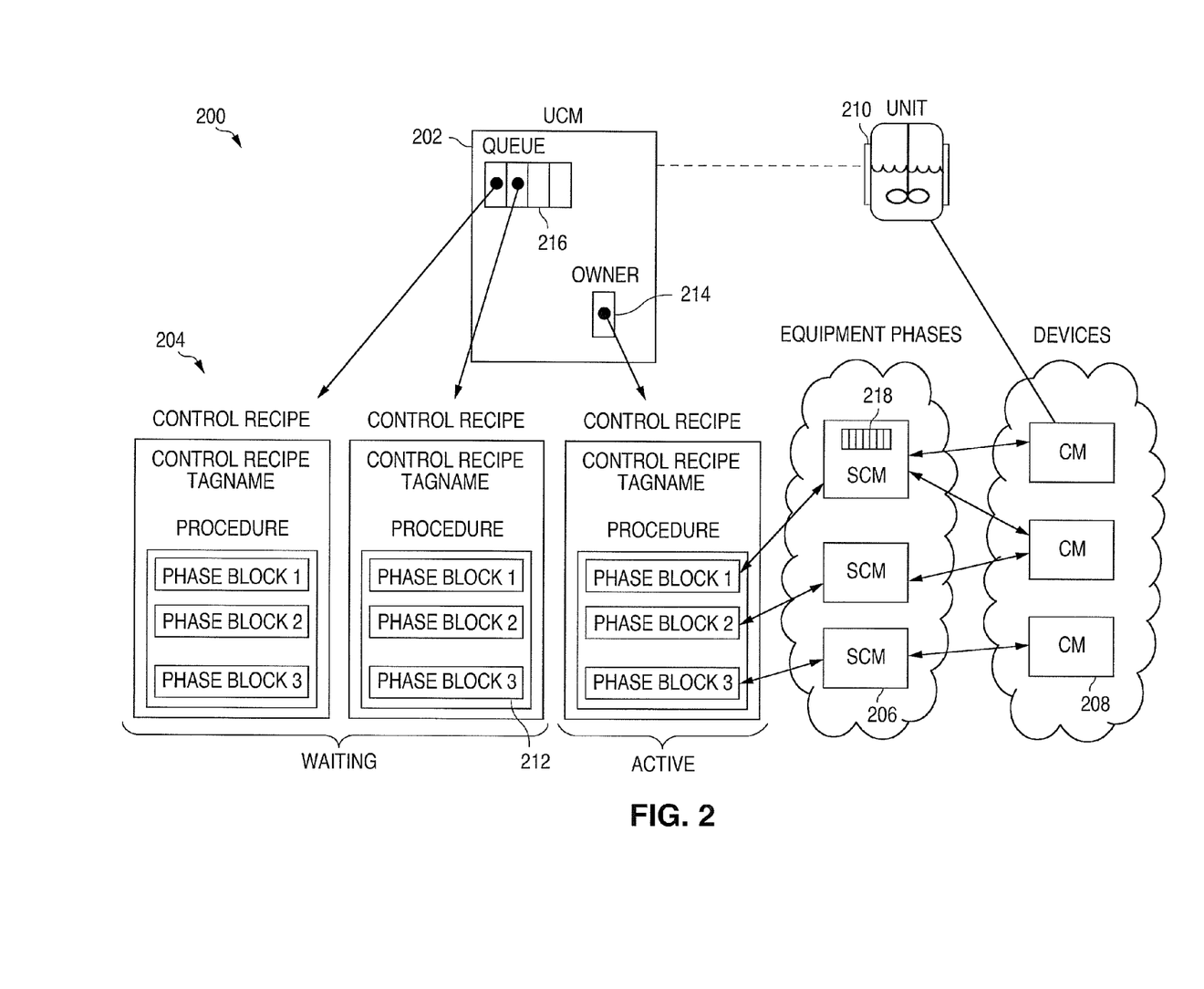
FIG. 2 illustrates a specific implementation of a process control system in accordance with this disclosure.

FIG. 2 illustrates a specific implementation of a process control system 200 in accordance with this disclosure. For example, the process control system 200 of FIG. 2 could represent a specific implementation of the process control system 100 of FIG. 1, where many of the components in FIG. 2 are used or supported by the controllers 104a-104b of FIG. 1.

As shown in FIG. 2, the process control system 200 includes one or more unit control modules (UCMs) 202, recipe control modules (RCMs) 204, sequential control modules (SCMs) 206, and control modules (CMs) 208. In some embodiments, the unit control modules 202, recipe control modules 204, sequential control modules 206, and control modules 208 are distributed across multiple control execution environments in the process control system 100, such as in different controllers 104a-104b.

A unit control module 202 generally represents or is associated with a process unit 210 that contains one or multiple pieces of processing equipment, where use of the process unit 210 occurs after acquisition of the unit control module 202. As described in U.S. patent application Ser. No. 11/453,119, requester function blocks and resource function blocks can be invoked by, incorporated into, or otherwise used by the various control modules 202-208. The resource function blocks represent objects that can be acquired and released by the requester function blocks, where the requester function blocks use arbitration requests to attempt to acquire the resource function blocks. In these embodiments, a unit control module 202 can be acquired by a recipe control module 204, which allows the process unit 210 to be used during execution of the recipe control module 204.

A recipe control module 204 generally represents information defining the production requirements for one or more specific products (or parts thereof), where execution of a recipe control module 204 could result in the production of a single batch of the one or more products (or parts thereof). A recipe control module 204 could include a header, a procedure, a formula, and any equipment requirements. The procedure in a recipe control module 204 is defined by a set of phases represented by phase function blocks 212. Each phase of a recipe control module 204 is associated with a sequential control module 206, which interacts with one or more control modules 208 to implement one of the phases of the recipe control module 204. The control modules 208 provide access to and control over the actual process unit 210. The procedure in a recipe control module 204 could also include a set of step, transition, and synchronization blocks. Step blocks provide read/write access to the control modules 208, and synchronization blocks allow parallel execution of phase function blocks 212 or step blocks.

A recipe control module 204 manipulates the sequential control modules 206 through its phases, where the phases control the sequential control modules 206, monitor the execution states of the sequential control modules 206, and optionally propagate the execution states to the recipe control module 204. Phase function blocks 212 may also monitor their parent recipe control modules' states and propagate the states to their underlying sequential control modules 206 when their parent recipe control modules 204 enter abnormal states. In particular embodiments, the various control modules 204-208 could operate as defined by the International Electrotechnical Commission (IEC) 61131 and 61512 (including 61512-1) standards or in U.S. Pat. No. 6,317,638 (all of which are hereby incorporated by reference).

When a recipe control module 204 is created, it may optionally be associated with a specific unit control module 202. The unit control module 202 can be acquired when the recipe control module 204 is executed and can optionally be released by the recipe control module 204 at any time, such as when the recipe control module 204 reaches a terminal state or at any other previous time. Various parameters can be defined within the phase function blocks 212. These parameters may include a reference to a sequential control module 206 for execution control, a resource name to be allocated when a phase is started, and a flag indicating if the acquired resource will be released at the end of the execution of a sequential control module 206. By default, the resource name may be based on the selected sequential or recipe control module's name. If there is no selected sequential control module 206, a phase can be used for resource management purposes. Once in a terminal state, all resources acquired by the recipe control module 204 may or may not be released depending on the configuration flag.

An owner pointer 214 in the unit control module 202 identifies the recipe control module 204 currently being executed (the recipe control module 204 that currently owns or has acquired the unit control module 202). An arbitration queue 216 identifies a specified number of recipe control modules 204 waiting to acquire the unit control module 202 to execute. When the current recipe control module 204 (identified by the owner pointer 214) releases the unit control module 202, the unit control module 202 can select the next recipe control module 204 from the queue 216 using any arbitration technique supported by the unit control module 202 or defined by the user (such as first-in, first-out or other technique). Similarly, the sequential control module 206 may include an arbitration queue 218. One or more recipe control modules 204 that are waiting to acquire the sequential control module 206 on behalf of its phase blocks are identified in the arbitration queue 218 of the sequential control module 206. The recipe control modules can be selected from the queue 218 in any order.

In general, a phase function block 212 in a recipe control module 204 represents a function block used to acquire, initiate execution of, and monitor execution of a sequential control module 206 or another recipe control module 204. For example, if a phase function block 212 is configured to execute a sequential control module 206, the phase function block 212 may acquire the sequential control module 206, load formula parameters into the sequential control module 206, and start the sequential control module 206. The formula parameters represent a set of parameters used by a phase to communicate appropriate recipe data to a sequential control module 206, such as data controlling how the process unit 210 is used during the phase execution.

While a sequential control module 206 is executing, the phase function block 212 may monitor the status of the sequential control module 206. The phase function block 212 may also project data from the sequential control module 206 so that SCM execution can be monitored by a recipe control module 204 through the phase function block 212. Further, the phase function block 212 may command the sequential control module 206 to upload various report parameters to the phase function block 212, such as when execution of the sequential control module 206 is complete or another terminal state is reached. Depending on the configuration, a phase function block 212 may or may not wait for the sequential control module 206 to complete before the phase completes, which allows the recipe control module 204 to proceed to the following phase or step. Moreover, depending on the configuration, the phase function block 212 may or may not release any acquired resources (such as the sequential control module 206) at the completion of the phase.

In some embodiments, the functionality of a phase function block 212 can be divided into three general categories. First, the phase function block 212 may provide or download data (such as parameter definitions and formula parameters) to a sequential control module 206 and receive or upload data (such as result parameter values) from the sequential control module 206. Second, the phase function block 212 may provide step-like behavior, including control of the sequential control module 206. Third, the phase function block 212 can engage in resource arbitration by requesting acquisition of and releasing the sequential control module 206. These functions could be implemented as independent as possible to provide a higher degree of modularity, more simplified testing, and more universal use.

Although FIG. 2 illustrates a specific implementation of a process control system 200, various changes may be made to FIG. 2. For example, the process control system 200 could include any number of unit control modules 202, recipe control modules 204, sequential control modules 206, control modules 208, process units 210, and phase function blocks 212.

Figure 3:
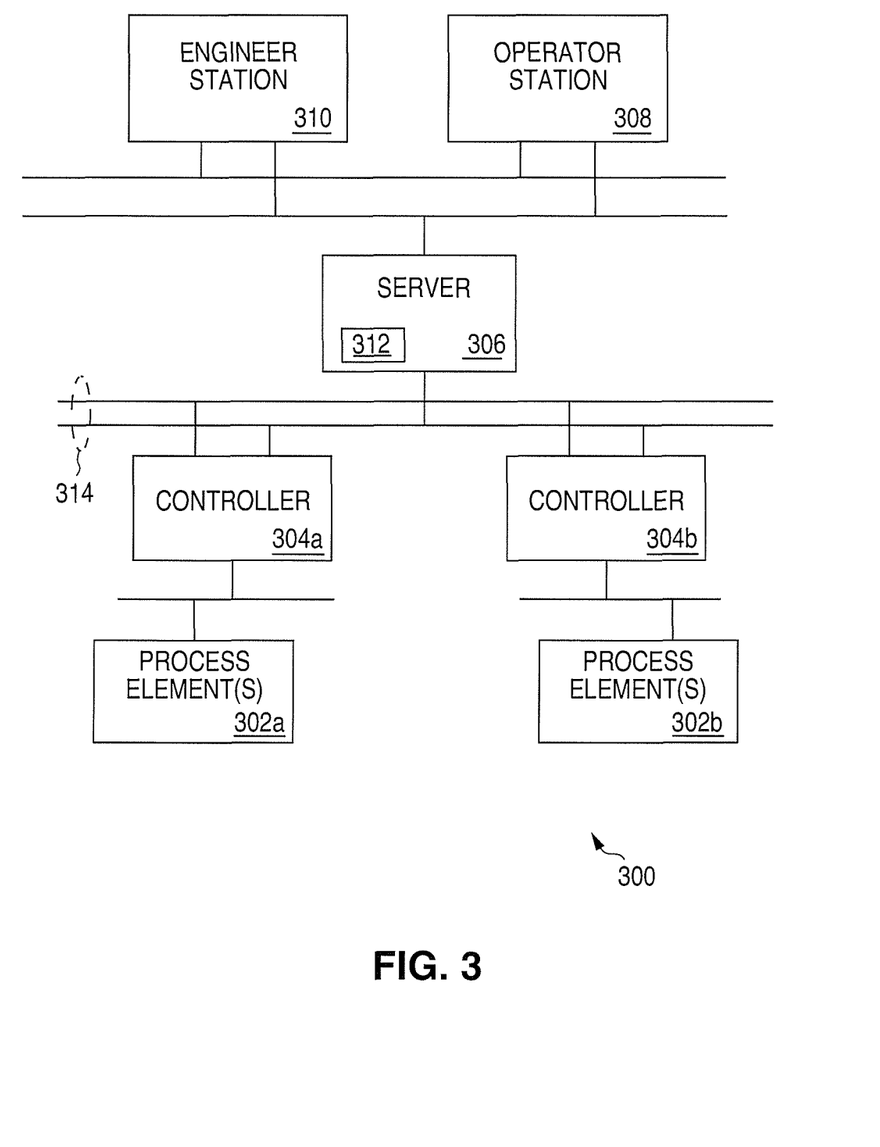
FIG. 3 illustrates another example process control system in accordance with this disclosure.

FIG. 3 illustrates another example process control system 300 in accordance with this disclosure. In particular, the process control system 300 of FIG. 3 could represent a specific implementation of the process control system 100 of FIG. 1, where many of the components in FIG. 3 are similar to or the same as the components of FIG. 1.

As shown in FIG. 3, the process control system 300 includes process elements 302a-302b, controllers 304a-304b, a server 306, an operation station 308, and an engineer station 310. The server 306 includes one or more memories, represented by memory 312. The components 302a-308 may be the same as or similar to the corresponding components in FIG. 1. The engineer station 310 represents one or more computing devices that allow one or more engineers to draft, develop, maintain, test, and save one or more master recipes. Once developed, the master recipes may be communicated over a network to the server 306 and stored in the memory 312, as described in greater detail below. The memory 312 may include one or more databases.

In some embodiments, the controllers 104a-104b, 304a-304b are resource-constrained controllers. That is, the controllers 104a-104b, 304a-304b may not include large amounts of memory or processing power. For example, the amount of memory or processing power of the controllers 104a-104b, 304a-304b may be orders of magnitude less than a typically configured general-purpose computer (such as a PC). In a particular example, the controllers 104a-104b, 304a-304b may include approximately 16 MB of memory or less, in contrast to a typically configured PC that includes 2 GB of memory or more. Some systems that use general-purpose computers with greater memory to control production system elements often fail to fully support requirements for robustness, availability, and performance. PCs can process large amounts of data, but they have difficulty operating deterministically and in small time slices. While the data requirements of batch production may not be especially large, the low latency and high robustness requirements of batch production tend to be significant. Thus, the controllers 104a-104b, 304a-304b are optimized to control the process elements 302a-302b in the process control system 100, 300 with low latency and high robustness.

Unlike some systems that instantiate recipe components within a single recipe container (e.g., a single server), the process control system 100, 300 promotes optimization of instantiation of any components, recipes, and data on a controller-by-controller basis. The modular approach of the process control system 100, 300 supports continuous incremental expansion by adding new controller resources, instead of a monolithic single container approach.

The process control systems 100, 300 are both real-time capable and deterministic. The term "deterministic" generally refers to the ability to predict or specify the behavior of a program or environment. Conventional production environments are not deterministic because they typically suffer from occasional and unpredictable delays, including delays associated with functions performed in one or more control recipes. These delays represent non-deterministic behavior in the conventional production environments.

This non-deterministic behavior makes the conventional production environments unsuitable for use with real-time applications. The term "real-time" generally refers to applications or programs that interact with an associated environment or otherwise operate in a way that is carefully timed. Thus, a real-time application operates in a real-time system according to a predetermined schedule and provides an indication to the system if a particular process or activity is not performed according to the schedule.

A real-time system is characterized by two properties. The first is that for a given action, the maximum amount of time that may be required to perform the action can be predicted. The second property is that if the system cannot adhere to the timeline, the system will indicate that the timeline is no longer adhered to. That is, in a real-time system, one or more applications or components of the system will not simply operate in a delayed timeline without some sort of notification or indication. In systems that do not provide a notification of a delay or a missed deadline, a controller that controls a process that occurs later in the recipe may not be aware of the delay or missed deadline and therefore may not be able to react by adjusting its process or processes.

The non-deterministic behavior of conventional production environments often results in non-deterministic behavior in the execution of real-time applications. As a result, the applications often cannot maintain their exact time schedules when executed in conventional production environments, which causes the applications to fail.

In the process control systems 100, 300, the controllers 104a-104b, 304a-304b execute certain algorithms according to real-time principles. The controller algorithms are configured to anticipate future resource requirements, which allows the controllers 104a-104b, 304a-304b to avoid becoming a bottleneck. For example, through use of the algorithms, the controllers 104a-104b, 304a-304b use production process times to create one or more control recipe elements before the elements are needed as described in greater detail below. The algorithms are configured to balance the competing interests of loading only recipe processes that are needed immediately (thereby saving memory and processing resources but risking higher system latency) and loading additional processes that are anticipated to be needed (thereby using additional resources but helping to ensure lower system latency).

In one aspect of operation, a master recipe is saved in the memory 107b, 312 of the server 106a-106b, 306. Before a batch process is to be executed, the master recipe is released for production. In some embodiments, the master recipe is loaded from the server 106a-106b, 306 to the controller 104a, 304a, which may represent a first controller or single controller. In particular embodiments, is the master recipe is loaded onto only one controller. However, in other embodiments, it may be necessary or desirable to load the master recipe onto more than one controller.

After the master recipe is loaded onto the controller 104a, 304a, an event causes a control recipe to be initially created in the controller 104a, 304a. The event may be a command from the operator station 108a-108c, 308, a process start condition, an external application, another event, or a combination of two or more events. The control recipe is an executable version of part (or possibly all) of the master recipe. Run-time data is associated with the created instance of the control recipe. Conventional (such as PC-controlled) systems may copy the entire master recipe into the control recipe. However, the embedded controllers 104a-104b, 304a-304b of the process control system 100, 300 may be resource-constrained. For example, in some embodiments, the controllers 104a-104b, 304a-304b may include only 16 MB of memory, and may be unable to store the entire master recipe in memory. Thus, it may be advantageous to initially copy only a portion of the master recipe into the control recipe. For instance, the controller 104a, 304a may initialize only the portion of the control recipe that is needed to start execution of the process. As a particular simplified example, if a recipe includes ten process steps, the control initializes only the first step to start execution. Later, while the first step is being executed, the second of the ten steps is initialized, and so forth.

The controller 104a, 304a executes the control recipe, which may result in the controller 104a, 304a creating and executing one or more additional control recipes. Moreover, the execution of a control recipe in the controller 104a, 304a may result in the controller 104b, 304b creating and executing one or more control recipes. Each instance of each control recipe is associated with its own run-time data. Due to the connection of the controllers 104a-104b, 304a-304b (such as over a peer-to-peer or other network 114b, 314), one controller (such as controller 104a, 304a) can house the master recipe, and other controllers (such as controller 104b, 304b) can build their own control recipes by reading the master recipe over the network.

During execution by the controllers 104a-104b, 304a-304b of the one or more control recipes, the operator station 108a-108c, 308 may receive data from and transmit data to the controllers 104a-104b, 304a-304b. The data may be status information, operational history, or instructions related to the controllers 104a-104b, 304a-304b, the process elements 102a-102b, 302a-302b, other information, or a combination of data. The operator station 108a-108c, 308 may exchange information directly with the controllers 104a-104b, 304a-304b or indirectly, such as via a path through the server 106a-106b, 306. At a later time, the server 106a-106b, 306 may collect post-execution data and store the data in the memory 107b, 312.

To avoid the earlier-described problems with conventional systems (resource exhaustion, large latencies, system failures, and the like), the process control system 100, 300 may use one or more of multiple techniques to optimize processing. These techniques are optimized for robust, real-time control platforms, such as the process control system 100, 300.

In a first technique, data that is to be used in one or more control recipes (but that is defined to be non-modifiable for security, safety, integrity, or other reasons) is not copied in the control recipe at the controller 104a-104b, 304a-304b. Instead, each control recipe contains only a reference or pointer to the master recipe data. The data is presented to other control equipment, data collection facilities, and human operators as if it is a full copy of the data. This technique reduces the amount of data to be copied, such as by a factor of approximately 1.5 to 10, depending on the nature of the control recipe.

In a second technique, only the data that is needed to prepare and execute the beginning of the production activity is copied from the master recipe to the control recipe. This reduces control recipe data, such as by a factor of approximately 10 to 100, for this critical time in the production process. For example, the master recipe may be very long. However, a particular controller 104a-104b, 304a-304b may need only a portion of the full recipe to start operation. Other portions of the recipe can be copied to the controller as needed. Some portions of the recipe may never be needed by the controller, so copying those portions of the recipe to the controller represents an unnecessary use of resources. For example, a recipe may contain one or more decision points and different branches that are executed based on the decision points. Branches that are never executed due to earlier decisions do not need to be copied at the beginning of the production activity, and in fact may never need to be copied during a particular production process.

In a third technique, data that is specific to some equipment (such as process elements 102a-102b, 302a-302b) and not specific to the master recipe is stored and maintained outside of the master recipe. For example, if a process element 302a is a mixer, the master recipe may include information regarding a mixer class but may not include data specific to the mixer, such as location, identifier, size, and so forth. In some embodiments, the equipment-specific data for the mixer may be stored at the associated controller. The data may be made available to peer controllers, such as via a real-time peer-to-peer network. For example, the controller 304b may also have access to data stored at the controller 304a. This reduces data duplication among cost-intensive real-time controllers and makes the system economically scalable, even to large batch production facilities. Moreover, by storing the data in a single location, the maintenance of that data may not require any data duplication or repetitive work by humans, thereby keeping the costs of associated services to a minimum.

In a fourth technique, one or more data allocations associated with near-future process steps in the control recipe are completed ahead of time at the controller 104a-104b, 304a-304b. That is, the data allocations associated with a given process step in the control recipe are performed at least one step in advance of when the data will be used. This pre-allocation of data reduces latencies associated with production decisions and initiation of future steps and activities. In some embodiments, the high-level prediction strategy and timing characteristics may be configurable for better economic use of the process control system 100, 300. As an additional benefit, the internal execution of this technique ensures compliance with real-time objectives without any detailed knowledge by the recipe author.

By using one or more of the techniques described above, the controllers 104a-104b, 304a-304b may allocate the remaining control recipe data on-demand in a transparent manner in most practical situations while maintaining real-time, deterministic characteristics. In situations where the remaining unallocated control recipe data cannot be allocated on-demand in a transparent manner in compliance with the integrity requirements of the embedded controller platform (such as by maintaining time periods for time-discrete analog control algorithms, maintaining redundancy of controllers), only a part of the data may be copied on-demand. The remaining data may be scheduled for the next available time slice. The process control system 100, 300 may include configuration options to diagnose and/or report the occurrence of these situations to allow post-execution analysis of such occurrences, either for adjustment of the automation system or for impact analysis on the final production outcome as required in some industries. Many processes are tolerant to small delays in execution of process steps, but some may not be. Therefore, these techniques allow for economic sizing of the system without undue productions risks.

Although FIG. 3 illustrates an example process control system 300, various changes may be made to FIG. 3. For example, a process control system could include any number of process elements, controllers, servers, operator stations, engineer stations, and networks. Additionally, the process control system 300 could include other features of the process control system 100 of FIG. 1, such as the single networks 116a-116c and the remote stations 108b.

Figure 4:
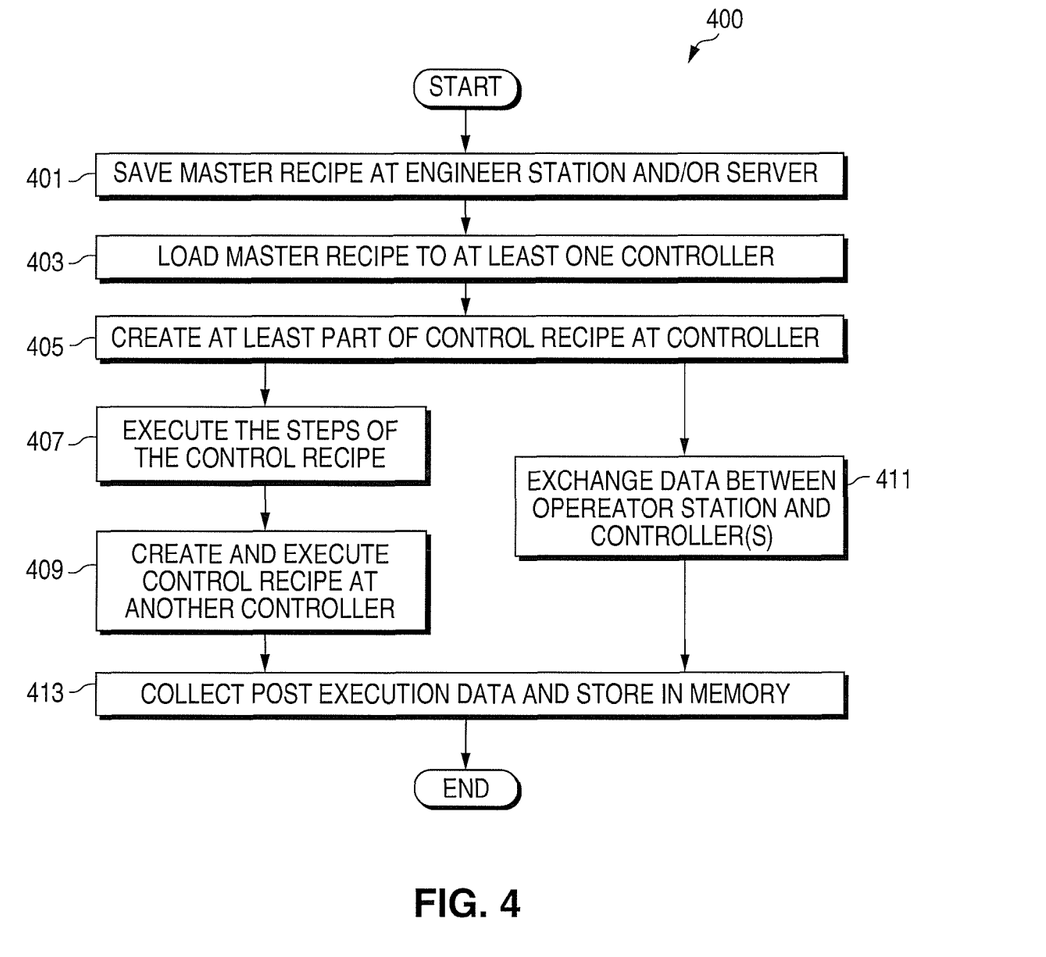
FIG. 4 illustrates an example method for supporting robust real-time control in an automated process control system in accordance with this disclosure.

FIG. 4 illustrates an example method 400 for supporting robust real-time control in an automated process control system in accordance with this disclosure. For ease of explanation, the method 400 is described as involving the process control system 300 of FIG. 3. The method 400 could be used with any other system.

Initially, at step 401, a process engineer or other personnel develops and saves a master recipe at an engineer station (such as engineer station 310). Alternatively or in addition, the master recipe is saved in a server database (such as server memory 312). This can be an off-line activity that occurs before batch process execution.

Before a batch process is to be executed, the master recipe is released for production at step 403. The master recipe may be loaded onto only one controller or onto more than one controller (such as one or more controllers 304a-304b).

After the master recipe is loaded to the controller(s), an event (such as an operator command or process start condition) causes a control recipe to be initially created in the controller(s) at step 405. According to one technique, data that is to be used in the control recipe, but that is defined to be non-modifiable, is not copied in the control recipe at the controller(s). According to another technique, only the data that is needed to prepare and execute the beginning of the production activity is initialized in the control recipe.

At step 407, the controller executes the steps of the control recipe, which may result in the controller creating and executing one or more additional control recipes. According to one technique, the controller pre-allocates data associated with near-future steps in the control recipe at least one step in advance of when the data will be used. Moreover, the execution of a control recipe in the controller may result in another controller creating and executing one or more control recipes at step 409.

During execution by the controller(s) of the one or more control recipes, an operator station (such as operator station 308) may receive data from and transmit data to the controller(s) at step 411. The data may include status information, operational history, instructions related to the controllers or process elements, or other information. According to one technique, data that is specific to one equipment and not specific to the master recipe is stored and maintained outside of the master recipe. At a later time, in step 413, a server (such as server 306) may collect post-execution data and store the data in a memory.

Although FIG. 4 illustrates one example of a method 400 for supporting robust real-time control in an automated process control system, various changes may be made to FIG. 4. For example, while shown as a series of steps, various steps shown in FIG. 4 could overlap, occur in a different order, occur in parallel, or occur multiple times. Moreover, some steps could be combined or removed, and additional steps could be added.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   initializing, at a first controller, at least one first process step of a first control recipe from a master recipe associated with a batch process in response to detection of an event associated with the batch process;
   executing, at the first controller, the at least one first process step of the first control recipe;
   initializing, at the first controller, at least one second process step of the first control recipe while executing the at least one first process step of the first control recipe;
   initializing, at a second controller, at least one process step of a second control recipe from the master recipe during execution of at least one of the process steps of the first control recipe; and
   executing, at the second controller, the at least one process step of the second control recipe.

2. The method of claim 1, wherein initializing the at least one first process step of the first control recipe from the master recipe comprises copying only a portion of the master recipe into the first control recipe that is needed to begin execution of the first control recipe.

3. The method of claim 1, wherein the first control recipe comprises a pointer to non-modifiable data in the master recipe.

4. The method of claim 1, wherein:
   the first and second controllers are connected over a peer-to-peer network; and
   equipment-specific data is shared between the first and second controllers over the peer-to-peer network.

5. The method of claim 1, further comprising:
   allocating data associated with a given process step in the first control recipe in advance of when the data will be used.

6. The method of claim 1, wherein the first and second controllers comprise part of a deterministic, real-time process control system.

7. The method of claim 1, wherein each of the first and second controllers is a resource-constrained controller.

8. The method of claim 1, wherein the master recipe is stored at the first controller.

9. The method of claim 1, wherein:
   each process step of the first control recipe represents an executable version of part of the first control recipe; and
   each control recipe contains load-time data from the master recipe and run-time data.

10. A system comprising:
    a first controller comprising at least one memory and at least one processing unit, the at least one processing unit configured to:
    initialize at least one first process step of a first control recipe from a master recipe associated with a batch process in response to detection of an event associated with the batch process;
    execute the at least one first process step of the first control recipe; and
    initialize at least one second process step of the first control recipe while executing the at least one first process step of the first control recipe; and
    cause a second controller to initialize at least one process step of a second control recipe from the master recipe and execute the at least one process step of the second control recipe during execution of at least one of the process steps of the first control recipe.

11. The system of claim 10, wherein the at least one processing unit is configured to copy only a portion of the master recipe into the first control recipe that is needed to begin execution of the first control recipe.

12. The system of claim 10, wherein the first control recipe comprises a pointer to non-modifiable data in the master recipe.

13. The system of claim 10, further comprising:
    at least one network interface configured to communicate over a peer-to-peer network;
    wherein the at least one processing unit is configured to share equipment-specific data over the peer-to-peer network.

14. The system of claim 10, wherein the at least one processing unit is further configured to allocate data associated with a given process step in the first control recipe in advance of when the data will be used.

15. The system of claim 10, wherein the system comprises a portion of a deterministic, real-time process control system.

16. The system of claim 10, wherein the system comprises a resource-constrained controller.

17. The system of claim 10, wherein the master recipe is stored in the at least one memory.

18. The system of claim 10, wherein each process step of the first control recipe represents an executable version of part of the first control recipe.

19. A non-transitory computer readable medium embodying a computer program, the computer program comprising computer readable program code for:
    initializing, at a first controller, at least one first process step of a first control recipe from a master recipe associated with a batch process in response to detection of an event associated with the batch process;
    executing, at the first controller, the at least one first process step of the first control recipe;
    initializing, at the first controller, at least one second process step of the first control recipe while executing the at least one first process step of the first control recipe; and
    causing a second controller to initialize at least one process step of a second control recipe from the master recipe and execute the at least one process step of the second control recipe during execution of at least one of the process steps of the first control recipe.

20. The non-transitory computer readable medium of claim 19, wherein the computer readable program code for initializing the at least one second process step of the first control recipe comprises computer readable program code for:

using one or more production process times to initialize the at least one second process step of the first control recipe before the at least one second process step is needed.

* * * * *